(12) United States Patent
Andrusiak et al.

(10) Patent No.: US 7,626,537 B2
(45) Date of Patent: Dec. 1, 2009

(54) RADAR DISPLAY SYSTEM AND METHOD

(75) Inventors: Martin J. Andrusiak, St. Paul, MN (US); Scott J. Benjamin, Lakeville, MN (US); John L. Gohman, Rosemount, MN (US); Kenneth D. Dunne, Shoreview, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 53 days.

(21) Appl. No.: 12/059,269

(22) Filed: Mar. 31, 2008

(65) Prior Publication Data

US 2009/0051583 A1    Feb. 26, 2009

Related U.S. Application Data

(60) Provisional application No. 60/959,334, filed on Jul. 13, 2007.

(51) Int. Cl.
    *G01S 7/04* (2006.01)
(52) U.S. Cl. .................................. 342/177; 342/185
(58) Field of Classification Search ......... 342/176–177, 342/185
    See application file for complete search history.

(56) References Cited

U.S. PATENT DOCUMENTS

| | | |
|---|---|---|
| 5,923,285 A | 7/1999 | Andrusiak et al. |
| 6,140,955 A | 10/2000 | Andrusiak et al. |
| 6,211,814 B1 | 4/2001 | Benjamin et al. |
| 6,507,833 B1 * | 1/2003 | Hichwa et al. .................. 707/1 |
| 6,806,825 B2 | 10/2004 | Andrusiak et al. |

OTHER PUBLICATIONS

U.S. Appl. No. 60/959,334, filed Jul. 13, 2007, Andrusiak et al.
"AVS 5100," *Barco*, Embedded Computing Design, Nov. 15, 2000 [online]. [retrieved on Jun. 26, 2007]. Retrieved from the Internet:<URL:http://www.embedded-computing.com/products/search/fm/id/?8696>; 2 pgs.

\* cited by examiner

*Primary Examiner*—Ian J Lobo
(74) *Attorney, Agent, or Firm*—Mueting, Raasch & Gebhardt, P.A.

(57) ABSTRACT

Radar display methods and systems include a display processing apparatus that includes a central processing unit and a programmable graphics processing unit. A rendering function program executable by the programmable graphics processing unit under control of the central processing unit generates a plurality of sequential display image frames for use in displaying at least a radar image on a display (e.g., by applying a decaying function to an accumulated radar history image frame and updating the accumulated radar history image frame).

26 Claims, 6 Drawing Sheets

RADAR DISPLAY SYSTEM AND METHOD

CROSS-REFERENCE TO RELATED APPLICATIONS

This application claims the benefit of U.S. Provisional Application Ser. No. 60/959,334 filed 13 Jul. 2007, entitled "Radar Display System and Method," which is incorporated herein by reference in its entirety.

BACKGROUND

The present invention relates generally to radar video distribution and display. More particularly, the present invention relates to systems and methods of distributing and managing digitized radar video for display, e.g., display of scan converted radar with other information, such as overlay images or underlay images.

Computer system user interfaces have had several different architectures since their invention. Early computers used lights and buttons, or punch cards and printers to provide the user interface. Mainframe computers have traditionally used cathode ray tube (CRT) terminals that provided the user interface. The mainframe system was characterized by the fact that application programs run on the centralized computer housed in the computer center and users would interface to the computer via the display terminals and printers. A protocol was standardized for communication of output, or display commands and input or keyboard signals.

The invention of the personal computer changed the architecture to one where the computer processor and user interface devices were all highly integrated and co-located with the operator. The evolution of personal computers included the development of graphical user interfaces and pointing devices. The development of networks (e.g., local area networks, remote area networks, wide area networks, etc.) made it possible for many personal computers to share information easily in a distributed system. For example, client/server models where a client accesses a remote server by way of a network are common. For example, such architectures may be implemented with the client being a thin client implementation. In such a thin client implementation, the thin client uses the resources provided by an application server, which performs a substantial portion of the data processing for a particular application. The thin client is then used primarily to graphically display images provided from the application server. The communication between the client and server in such a thin client implementation may be over any sort of network.

However, such client server models may also be implemented with the client being a thick client implementation. In such an implementation, the client performs a large portion of data processing (e.g., the client performs a bulk of the application data processing) and also any processing for displaying the images.

The X windowing system is one example of a client/server display architecture, and is a dominant architecture on Unix-based operating systems. One objective of the X windowing system is to separate the processing of the user interface from the application program. The user interface is processed by a program typically referred to as the X server which runs on the client processor. The application program, also called the X client, runs on an application processor. The X windowing system is commonly used in distributed computing systems and it allows users to execute programs on a different computer than the operator interface computer. The X windowing system protocol for communication between the X client and the X server provides a set of commands for exchanging display, keyboard and pointer actions.

Such X windowing systems have been used to implement thin client architectures for the display of multi-media applications including radar images. For example, such an X windowing system for the display of radar is described in U.S. Pat. No. 6,806,825 to Andrusiak et al., entitled "Thin Client Radar and MultiMedia Networking." As described therein, an application server not only executes programs for the thin clients, but it also can provide the thin clients with access to all the resources available on the networks attached to the application server. The application server delivers data to the thin clients including, but not limited to, graphics, encoded audio and video, and encoded radar, which are decoded and displayed by the thin clients. The thin clients deliver data including, but not limited to, keyboard and control signals, pointer, and encoded audio and video data to the application server. Further, as described therein, the application server processes compressed digital radar data which includes both video and azimuth data, into radar pixel data and line segment display parameters. Radar pixel data is data from the application server and it corresponds to pixel values to be drawn on the screen, while compressed digital radar data arriving at the application server corresponds to the intensity of the received radar video.

Also as described in U.S. Pat. No. 6,806,825 to Andrusiak et al., the thin client has a processor and network interface to manipulate and move digital data. It has a display such as a flat panel or CRT that receives pixel data from a graphics system. The graphics system may include digital graphics memory, a digital video decoder that decodes digital video for display, a digital audio decoder that plays through speakers, a digital radar decoder that decodes digital radar data for display and a data mixing capability that allows graphics, video and radar data to be integrated into a unified display image. The encoders and decoders for video, audio and radar may utilize either custom hardware based methods or software based methods. However, it is indicated that custom hardware methods provide substantially higher system performance since multiple encoding and decoding tasks are performed simultaneously instead of serially as on a general purpose processor.

U.S. Pat. No. 6,806,825 to Andrusiak et al. places the line drawing functions for the radar in the thin clients, and the polar processing functions in the application server. The process utilizes radar scan conversion protocol extension components to pass a buffer of radar pixel data with a set of line drawing parameters to the thin client where the same buffer of data is drawn in one or more line segments as necessary to provide a hole-filled display. The line drawing parameters include the starting coordinates and slope of each line segment and a pointer to the data elements corresponding to the start and end of the line segment. The radar scan conversion protocol extension algorithms may be implemented either in software or in custom hardware. However, as indicated in U.S. Pat. No. 6,806,825, a software approach may require substantial resources since the processor must be able to perform this task as well as all other thin client tasks. On the other hand, a hardware approach offloads the processing to a custom circuit that performs the task in parallel with other tasks performed by the processor.

One exemplary hardware approach for the display of radar data uses a dedicated pixel data bus to insert radar data between overlay and underlay graphics, allowing map data to be placed beneath the radar image while target and track information is situated over the radar image.

However, such hardware approaches to the display of radar data have significant hardware cost associated therewith and, in addition, occupy significant space at the client (e.g., user terminal). Further, such a hardware implemented approach to the display of radar data substantially reduces the ability to be flexible with respect to the generation of images displayed, as well as with respect to the display of radar on various application platforms (e.g., Unix, Linux, Windows, etc.).

SUMMARY

The present invention provides a solution to the problem of using special hardware to display radar (e.g., display of scan converted radar with other context image information, such as overlay images or underlay images). For example, using the programmability of graphics processing units to provide for the display of radar, with or without, overlay and/or underlay images, reduces the cost associated with such processes, as well as saves space at the client terminal.

A radar display system according to one embodiment of the present invention includes one or more displays and one or more radar data sources providing digital polar coordinate radar data. The system further includes application processing apparatus to receive the digital polar coordinate radar data and provide one or more rectangular coordinate display parameters, wherein the one or more rectangular coordinate display parameters include at least polar to rectangular coordinate conversion information for use in converting the digital polar coordinate radar data to rectangular coordinate pixel radar image data and one or more decay rate parameters.

A display processing apparatus of the system includes a central processing unit and a programmable graphics processing unit. A rendering function program executable by the programmable graphics processing unit under control of the central processing unit generates a plurality of sequential display image frames for use in displaying at least a radar image on a display. The rendering function program, to generate each of the plurality of the sequential display image frames, comprises executable code to apply a decaying function to an accumulated radar history image frame based on the one or more decay rate parameters and to update the accumulated radar history image frame using rectangular coordinate pixel radar image data converted from digital polar coordinate radar data received from the application processing apparatus using at least the polar to rectangular coordinate conversion information. Applying the decaying function and updating the accumulated radar history image frame results in an updated and decayed accumulated radar history image frame for use in displaying at least a radar image on the display. The updated and decayed accumulated radar history image frame used in displaying at least a radar image on the display is stored as an accumulated radar history image frame for use in generating a subsequent display image frame.

In one embodiment of the radar display system, the system further comprises one or more other image data sources; each of the one or more other image data sources provides digital image data representative of one or more context images (e.g., underlay and/or overlay images). The application processing apparatus operates on the digital image data representative of the one or more context images to provide pixel image data representative of the one or more context images to be displayed with the at least one radar image. The rendering function program includes executable code to combine the pixel image data representative of the one or more context images with the updated and decayed accumulated radar history image frame to generate a composite image frame for use in presenting the one or more context images with the radar image on the display.

The radar display system may be implemented as a thin client wherein the system further includes an interconnection network coupled between the application processing apparatus and the display processing apparatus. However, the radar display system may also be configured as a thick client implementation wherein the application processing apparatus and display processing apparatus are co-located and may be partially or completely comprised of common hardware elements.

Further, the radar display system may be coupled to a radar distribution system, wherein an interconnection network is coupled between the one or more radar data sources and the application processing apparatus.

A radar display method according to one embodiment of the invention is also described. For example, the radar display method includes providing one or more displays and providing an application processing apparatus to receive digital polar coordinate radar data and provide one or more rectangular coordinate display parameters based thereon (e.g., the one or more rectangular coordinate display parameters include at least polar to rectangular coordinate conversion information for use in converting the digital polar coordinate radar data to rectangular coordinate pixel radar image data and one or more decay rate parameters). The method further includes receiving, at a display processing apparatus from the application processing apparatus, the digital polar coordinate radar data and the one or more rectangular coordinate display parameters. The display processing apparatus includes a central processing unit and a programmable graphics processing unit. A plurality of sequential display image frames are generated by the programmable graphics processing unit for use in displaying at least a radar image on a display. Each of the plurality of the sequential display image frames are generated by applying a decaying function to an accumulated radar history image frame based on the one or more decay rate parameters and updating the accumulated radar history image frame using rectangular coordinate pixel radar image data converted from digital polar coordinate radar data received from the application processing apparatus using at least the polar to rectangular coordinate conversion information. Applying the decaying function and updating the accumulated radar history image frame by the graphics processing unit results in an updated and decayed accumulated radar history image frame for use in displaying at least a radar image on the display. The updated and decayed accumulated radar history image frame used in displaying at least a radar image on the display is stored for use in generating a subsequent display image frame.

In one or more embodiments, the method may further include providing digital image data representative of one or more context images (e.g., underlay images and/or overlay images), wherein the application processing apparatus receives the digital image data representative of the one or more context images to generate pixel image data representative of the one or more context images to be displayed with the at least one radar image on the display. Generating each of the plurality of the sequential display image frames by the programmable graphics processing unit may further include combining the pixel image data representative of the one or more context images with the updated and decayed accumulated radar history image frame to generate a composite image frame for use in presenting the one or more context images with the radar image on the display.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

DETAILED DESCRIPTION OF EXEMPLARY EMBODIMENTS

Figure 1:
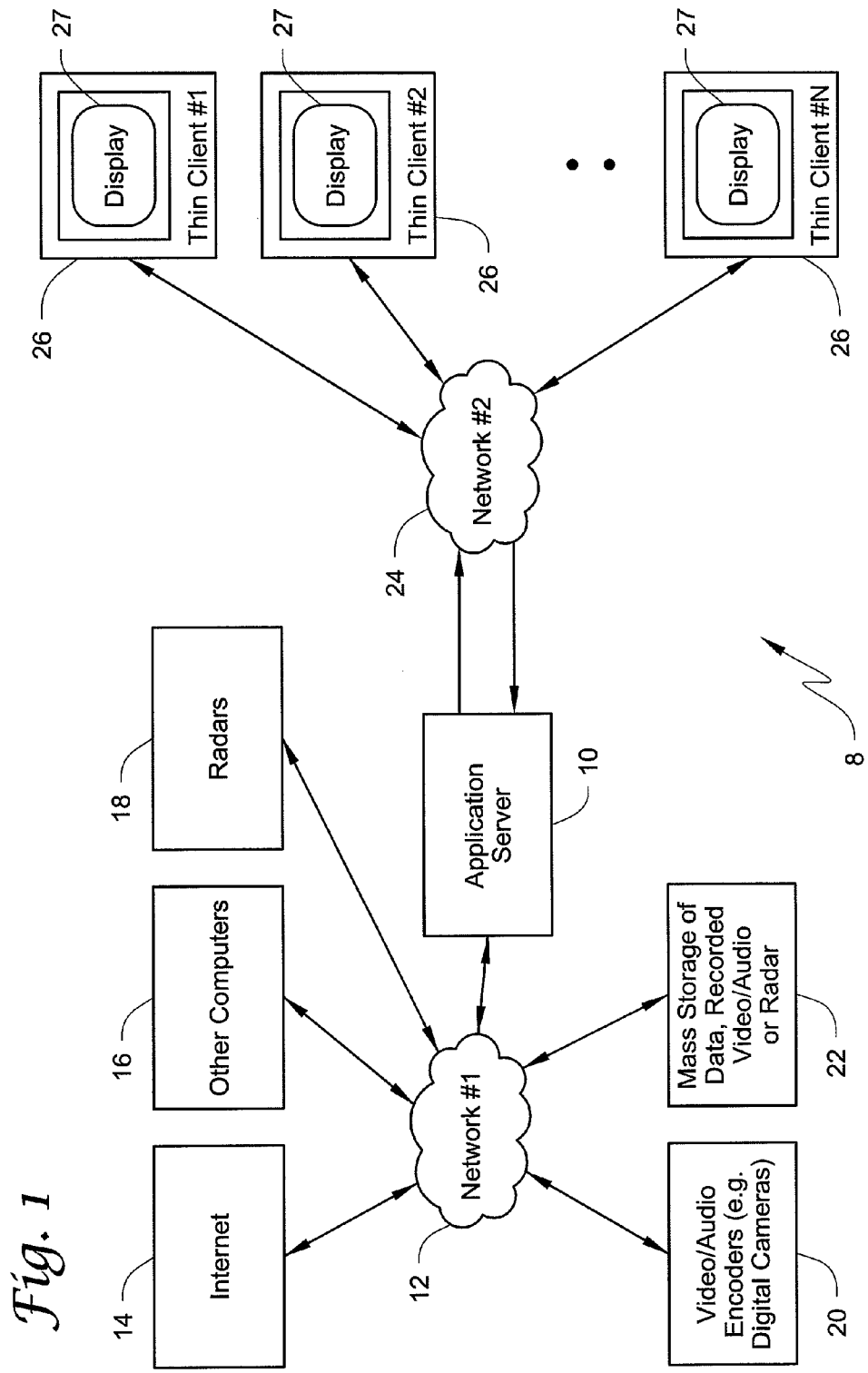
FIG. 1 is a block diagram of one exemplary embodiment of a radar display system architecture according to the present invention showing multiple thin display clients coupled to an application server via a network; the application server coupled to various data sources by way of a network.

In the following detailed description of exemplary embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

FIG. 1 shows a block diagram of one exemplary embodiment of a radar display system architecture 8. The radar display system architecture 8 includes an application server 10 that is located between two networks or network segments 12 and 24. One will recognize from the description herein that the system may be implemented using multiple application servers. The network or network segment 12 provides access to an array of networked services such as, but not limited to, the Internet 14, other computers 16, radars 18, audio and video encoders 20, or mass storage devices 22 that may contain recorded digital data including audio, video, or radar information (e.g., pre-recorded radar data, digitally simulated radar data, or digitally converted analog data). The second network or network segment 24 provides access to an array of thin display clients 26, each display client including display processing apparatus that, for example, includes a central processing unit and a graphics processing unit.

The radar display system architecture 8 is configured to provide for real-time display of radar/graphics. At least in one embodiment, this is accomplished with use of commercial off the shelf components (e.g., off the shelf graphics processing units). Further, at least in one embodiment, the system architecture 8 is configured to transport such a displayable image to multiple remote displays.

In the illustrative embodiment shown in FIG. 1, application programs are executed by the application server 10 that is operatively connected to both of the networks 12, 24. Each of the thin display clients 26 include displays 27 for display of at least a radar image, and further each of the display clients 26 may include a user interface, for example, to allow a user to control the information displayed on the displays 27.

The two networks 12, 24 are shown and described as being physically separate for clarity, however they may be logical segments of the same network. Further, such networks may take the form of any type of network structures including, for example, local area networks, remote area networks, and wide area networks, and including but clearly not limited to the Internet.

The application server 10 not only executes programs for the thin display clients 26, but may also provide the thin display clients 26 with access to all the resources available on the network 12 attached to the application server 10. For example, the application server 10 may deliver various types of data to the thin display clients 26 including, but not limited to, graphics, encoded audio and video, and radar data. For example, the application server 10 may provide digital polar coordinate radar data and polar to rectangular coordinate conversion information to a thin display client 26. Further, for example, the application server 10 may provide digital image data representative of one or more context images (e.g., overlay or underlay images) to the thin display client 26 for display with a radar image.

In one or more embodiments, the thin display clients 26 may provide data to the application server 10. For example, such data may include, but is not limited to, user provided information, such as keyboard and other Human Machine Interface (HMI) control data.

One or more portions or techniques of the system architecture described in U.S. Pat. No. 5,923,285 to Andrusiak et al., entitled "Low Bandwidth Digital Radar Video Distribution System" may be used as part of the radar display system architecture 8 shown in FIG. 1. As such, U.S. Pat. No. 5,923,285 is hereby incorporated by reference in its entirety. In other words, for example, the radar display system architecture 8 according to the present invention may be modified to retain the advantages of the system architecture of U.S. Pat. No. 5,923,285.

For example, the radars 18 may include radar processors of the type described in U.S. Pat. No. 5,923,285 so that the transmission of digital data to application server 10 occurs at a low bandwidth point of the scan conversion process. In other words, for example, distribution of digitized radar video from multiple radar systems may be provided to the application server 10 over a digital network (e.g., such as network 12) in a manner like that described in U.S. Pat. No. 5,923,285. For example, as described therein, analog video data may be digitized and compressed into range bins. Azimuth analog data, which is representative of the position(s) of the one or more antennas associated with a particular radar system, is also digitized. The digital azimuth is used to perform window detection which extracts the range bins required for a particular display. The compressed, window detected range bins and azimuth data may be transmitted to the application server 10 over the digital network (e.g., network 12).

However, digital polar coordinate radar data may be provided to the application server 10 by any method and is not limited to be provided in a manner as described in U.S. Pat. No. 5,923,285. Digital polar coordinate radar data as used herein includes data representative of one or more radar outputs. For example, in other words, at least in one embodiment, the radar outputs (e.g., which may be analog outputs) are input to a process of converting such outputs to digital polar coordinate radar data. These radar outputs include, but are clearly not limited to, antenna position, range zero trigger and radar video signals. The antenna position signals indicate the direction (azimuth and/or elevation) of the radar pulse. For a typical radar, antenna position is conventionally and hereafter referred to as azimuth. The range zero trigger indicates the time at which the radar pulse is fired. The round trip time from the range zero trigger to the radar video return provides the indication of the range (distance) from the radar to the target. The rate of the range zero trigger signal is defined as the pulse repetition frequency (PRF). The amplitude of the radar video represents a measure of the radar echo return signal after various types of signal processing.

The application server 10 (e.g., which includes application processing apparatus) processes the digital polar coordinate radar data, which, for example, includes both video and azimuth data, to generate at least polar to rectangular coordinate conversion information (e.g., line segment display parameters) for use in converting the digital polar coordinate radar data to rectangular coordinate pixel radar image data by the thin display client 26. For example, the processing apparatus of the application server 10 may map the polar coordinate radar data into rectangular screen coordinates, defining where the radar 'wedge' is to be drawn on a screen, and provide polar to rectangular coordinate conversion information (e.g., line segment display parameters) for the display processing apparatus of the thin display client 26 to use in performing the actual conversion or drawing of the radar image.

Further, for example, as will be described further herein, the application server 10 may provide any further rectangular coordinate display parameters for use by the thin display client 26 in rendering at least a radar image for display. For example, the application server 10 may also provide one or more decay rate parameters for use in applying a decaying function applied to an accumulated radar history frame by the thin display client 26.

In other words, at least in one embodiment of the present invention, the line drawing functions are performed by the thin display clients 26, however, the polar coordinate processing functions are performed in the application server 10. For example, at least in one embodiment, the process utilizing radar scan conversion protocol extension components as described in U.S. Pat. No. 6,806,825 to Andrusiak et al., entitled "Thin Client Radar and Multimedia Networking" is used to provide digital polar coordinate radar data and polar to rectangular coordinate conversion information (e.g., line segment display parameters) to the thin client display 26 over network 24 for use in converting the digital polar coordinate radar data to rectangular coordinate pixel radar image data by the thin display client 26. As described therein, polar coordinate radar data with a set of line drawing parameters is passed to the thin display client 26. These line drawing parameters may, for example, include the starting coordinates and slope of each line segment and a pointer to the data elements corresponding to the start and end of the line segment.

Figure 2:
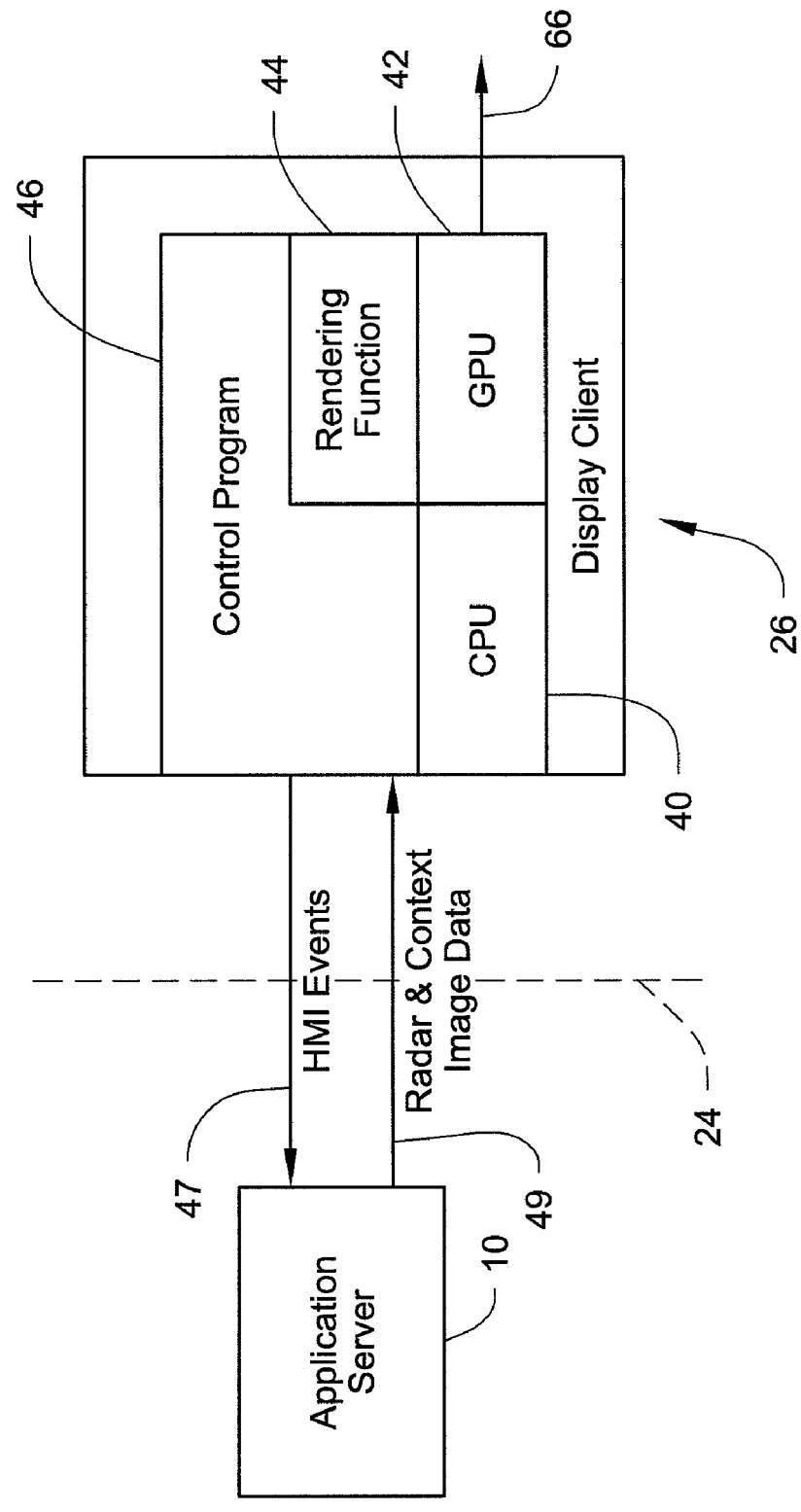
FIG. 2 is a summarized block diagram of an exemplary embodiment of a single thin display client including display processing apparatus (including both a central processing unit and a programmable graphics processing unit) coupled to an application server which may be used in a display system architecture as shown in FIG. 1.

A summarized block diagram of an exemplary embodiment of a single display client 26 according to the present invention is shown in FIG. 2; the display client being coupled to an application server 10 via a network 24. The display client 26 includes display processing apparatus that includes a central processing unit (CPU) 40 and a programmable graphics processing unit (GPU) 42, and any memory components suitable to carry out the functionality described herein (e.g., system memory, dedicated graphics memory, etc.). A rendering function program 44 (e.g., stored in memory) is executable by the programmable GPU 42 to generate a plurality of sequential display image frames 66 for use in displaying at least a radar image on the display 27. The rendering function program 44 is executed by the GPU 42, acting as a co-processor to the CPU 40, when called as a function by a control program 46 executing on the CPU 40. The software control program 46, for example, may be written using a graphics programming library such as OpenGL or DirectX which provides the software interfaces to control the programmable GPU 42. The rendering function program 44 may be written using a programmable shader language such as the OpenGL Shading Language (GLSL) with OpenGL, High Level Shader Language (HLSL) with DirectX, Cg or other high or low level programmable vertex and/or pixel shading languages.

The GPU 42 may include any suitable programmable GPU for carrying out the functionality described herein. For example, suitable GPUs may include GPUs available from ATI under the trade designation ATI Radeon or GPUs available from NVIDIA under the trade designation of NVIDIA GeForce, GoForce and Quadro. A suitable GPU should support programmable vertex and pixel shader capabilities as defined, for example, in DirectX shader model 2.0 or later, or OpenGL ARB_vertex_program, ARB_fragment_program and related OpenGL extensions.

Further, for example, the control program 46 (e.g., stored in associated memory) may be executable by the CPU 40 to allow a user to control the information to be displayed through communication of control information 47 (e.g., HMI events) to the application server 10. For example, the thin display client 26 may include one or more user input devices, such as a keyboard and pointer or equivalent manual input devices, voice activated devices, or any other input devices. At least in one embodiment, the display client 26 receives data 49 (e.g., radar data and context image data) from the application server 10 for use in displaying information as a result of the communication of control information 47 provided to the server. The CPU 40 may include any suitable processor for carrying out instructions and process data to perform the functionality described herein. Various types of input mechanisms (e.g., through a graphical user interface provided to the user) may be used to allow a user to provide input. For example, user selected parameters may be input using a windowing component, pull down menus, tuning mechanisms, control actuators, touch screens, on-screen slider control, text entry box, input value stored in a configuration file, etc. As described further herein, at least in one embodiment, display of at least a radar image in a particular viewing environment may be accomplished with the input of user control parameters provided by a user using any interface allowing for input or selection of such parameters. The present invention is not limited to any particular interface.

The user may control various display parameters, such as the decay rate of the radar, the radar source, the range scale, the window size, the radar offset, radar threshold or other video filtering functions, range, bearing and/or sweep indications, etc. Further, for example, the user may control the type of information to be displayed with the radar (e.g., underlay and/or overlay images).

Figure 3:
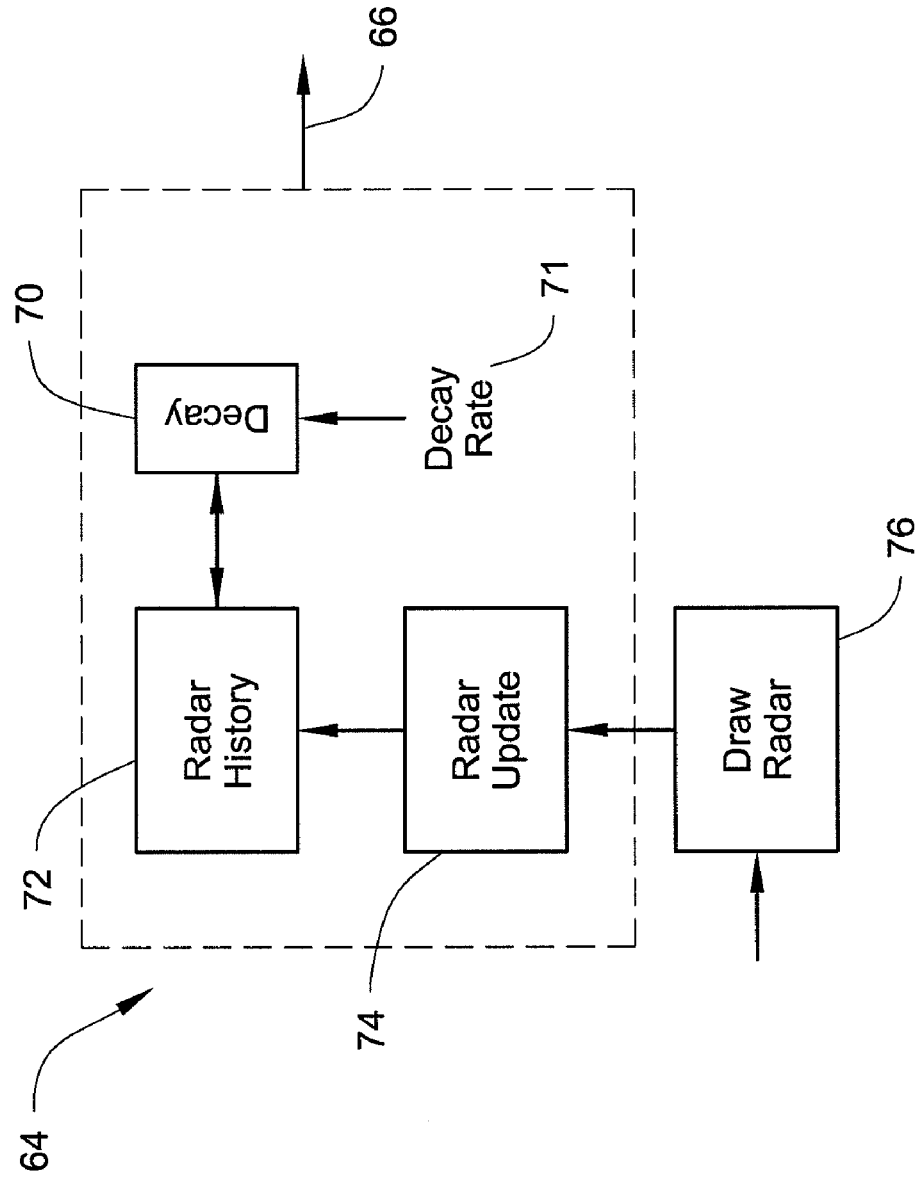
FIG. 3 is a flow diagram of one exemplary embodiment of a rendering function process, such as that which can be implemented by the program shown generally in FIG. 2, for use in displaying at least a radar image on a display according to the present invention.

FIG. 3 shows a flow diagram of one exemplary rendering process 64 that may be implemented by the rendering function program 44, such as shown generally in FIG. 2, for use in displaying at least a radar image on the display 27. The rendering process 64, as executed by the programmable GPU 42 under control of the CPU 40, generates a plurality of sequential display image frames 66 for use in displaying at least the radar image. Each of the plurality of the sequential display image frames 66 is generated by the GPU 42 executing code that at least applies a decaying function 70 to an accumulated radar history image frame 72 based on the one or more decay rate parameters 71 and that updates the accumulated radar history image frame 72 (block 74).

For example, such a rendering process 64 may be initialized by creating and initializing an accumulated radar history image frame (e.g., a defined two dimensional array object sized as a function of the display and representative of a plurality of prior display images) and creating and initializing a new radar image (e.g., a defined two dimensional array object for use in updating). Further, at least one or more decay parameters are set upon initialization. The rendering process 64 is then repeatedly called from the control program 46 executing on the CPU 40 in an update loop to generate the sequential display image frames (e.g., at a rate that matches the display update frame rate). The update loop may include at least polling for new radar image data to be used for updating the accumulated radar history image frame and polling for radar control information to obtain any update to the one or more decay parameters. With such data recognized, the GPU 42 applies a decaying function to the accumulated radar history image frame, adds the new radar image data to the decayed accumulated radar history image frame and outputs the resulting frame, and saves the output as a new accumulated radar history image frame for use in the next iteration.

The accumulated radar history image frame 72 is an image frame representative of one or more previously generated display image frames displayed by the system. For example, the GPU 42, upon providing a decayed and updated accumulated radar history image frame for use in displaying the radar image, may copy the decayed and updated image frame and store it as the accumulated radar history image frame 72 for use in generating a subsequent display image frame. As such, the radar history is used as part of the process of generating the sequential display image frames 66 so as to provide a desired fade of the data being displayed.

The decaying function 70 may be any suitable function providing a desired fade of the image being displayed. One or more decay rate parameters 71 are provided to the GPU 42 from the application server 10 for control of the decaying function 70. For example, the pixels of the accumulated radar history image frame 72 may have their intensity decremented by a predetermined decay value provided by the application server 10 (e.g., input and controlled by a user of the thin display client). The decay function is not limited to any particular process of decay of the intensity of the data. For example, the decay rate may be different for different pixels being displayed, older data may be decayed at a faster rate than new data, etc.

The updating of the accumulated radar history image frame 72 (block 74) with radar data may also be performed in any suitable manner. At least in one embodiment, for example, the updating of the accumulated radar history image frame 72 uses rectangular coordinate pixel radar image data converted from digital polar coordinate radar data received from application processing apparatus of application server 10 (e.g., radar data 49 as shown in FIG. 2).

As described previously herein, the application server 10 (e.g., application processing apparatus) processes digital polar coordinate radar data (e.g., received from any suitable radar source including real time and pre-recorded radar data), which, for example, includes both video and azimuth data, to generate at least polar to rectangular coordinate conversion information (e.g., line segment display parameters) for use in converting the digital polar coordinate radar data to rectangular coordinate pixel radar image data by the thin display client 26. In one embodiment, the rectangular coordinate conversion information is provided as input to a draw radar routine 76.

The draw radar routine 76 to draw the radar image (e.g., radial of an aggregate radial scan pattern) to be used in updating the accumulated radar history image frame 72 may be performed in any suitable manner. At least in one embodiment, the polar to rectangular coordinate conversion information provided by the application server 10 is used. For example, such conversion information may include a set of line drawing parameters such as the starting coordinates and slope of each line segment and a pointer to the data elements of the polar coordinate radar data corresponding to the start and end of the line segment. One or more embodiments of line drawing functions may be performed according to the present invention in substantially the same manner as described, for example, in U.S. Pat. No. 6,140,955 to Andrusiak et al., entitled "Ruler Algorithm for PPI Rectangular Radar Scan Converter with Staircase Line Drawing." Further, for example, at least in one embodiment, the process utilizing radar scan conversion protocol extension components as described in U.S. Pat. No. 6,806,825 to Andrusiak et al., entitled "Thin Client Radar and Multimedia Networking" may be used to provide digital polar coordinate radar data and polar to rectangular coordinate conversion information (e.g., line segment display parameters) to the thin client display 26 over network 24 for use in the line drawing.

The line drawing functions to provide a radar image may be performed by the CPU 40 and made available to the GPU 42 for use in generating the sequential display image frames for display of at least a radar image. However, in one or more alternate embodiments, the line drawing functions may be performed by the GPU 42.

At least in one embodiment, the updating of the accumulated radar history image frame 72 (block 74) with radar data may be performed by the GPU 42 accessing an update frame of rectangular coordinate pixel radar image data converted from the digital polar coordinate radar data using at least the polar to rectangular coordinate conversion information. The update frame of rectangular coordinate pixel radar image data may then be merged with the accumulated radar history image frame 72. For example, such merging of the image data may be implemented by the GPU 42 using a comparison of the update frame and the accumulated radar history image frame on a pixel by pixel basis and selecting for display the pixel having maximum intensity (e.g., the pixel having the highest intensity).

However, the updating of the accumulated radar history image frame 72 (block 74) with radar data may be performed directly without the generation of an update frame of data by having the GPU 42 execute image manipulation functions to draw the new radar data directly into the radar history image frame 72.

Figure 4:
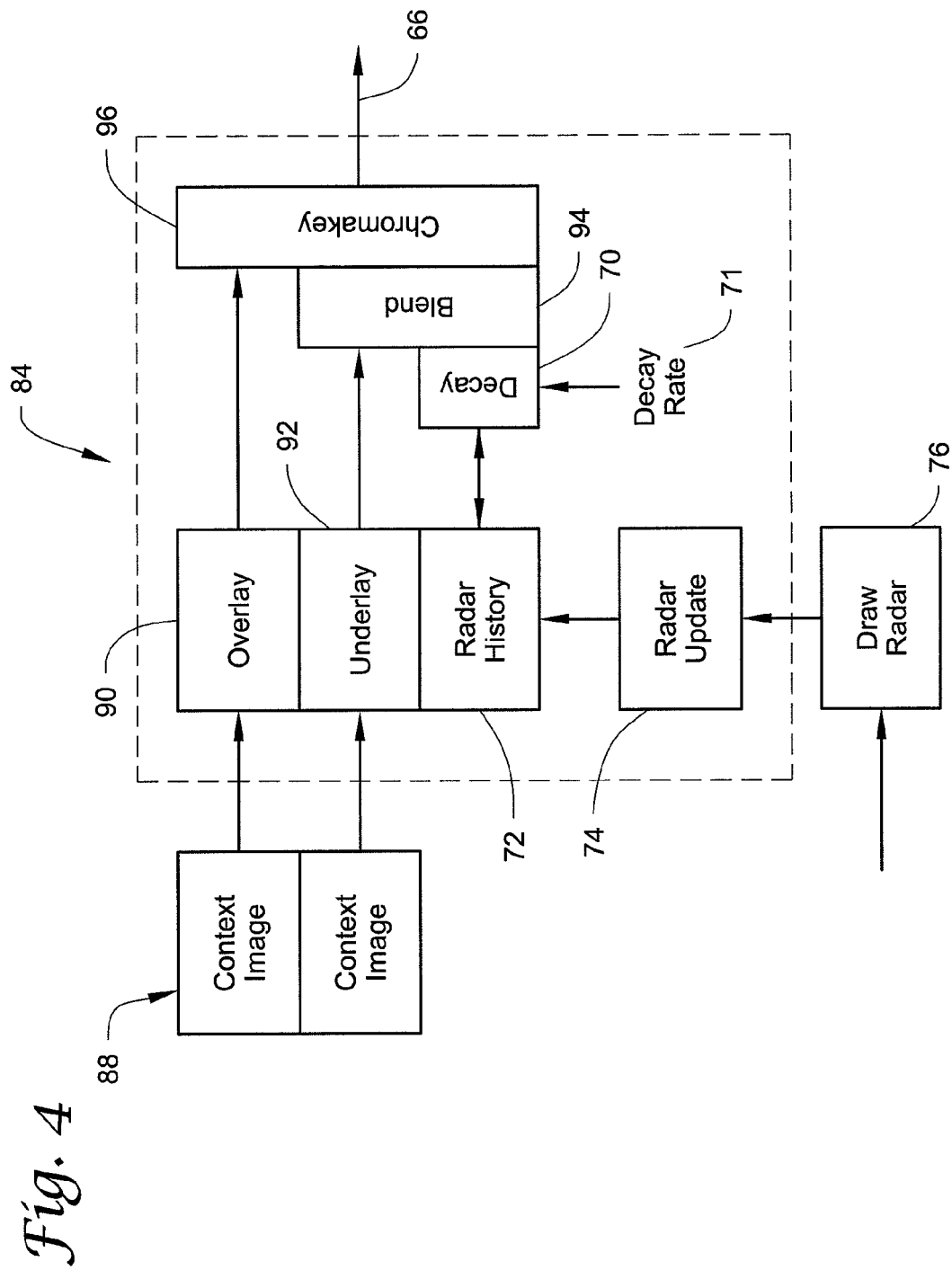
FIG. 4 is a flow diagram of another exemplary embodiment of a rendering function process, such as that which can be implemented by the program shown generally in FIG. 2, for use in displaying at least a radar image and one or more context images on a display according to the present invention.

The radar image may be displayed alone or in combination with other data such as one or more context images. FIG. 4 is a flow diagram of another exemplary rendering process 84 that may be carried out by the rendering function program 44, such as shown generally in FIG. 2, for use in displaying at least a radar image and one or more context images on the display 27. The rendering process 84, as executed by the programmable GPU 42 under control of the CPU 40, generates a plurality of sequential display image frames 66 for use in displaying a composite image including the radar image and one or more context images.

As used herein, context images refers to any image having a relationship to the radar image being displayed (e.g., which provides some context to the radar image, including, for example, without limitation, desktop controls, graphical user interfaces, or any other graphics or video). For example, a context image may be an underlay image or an overlay image to be inserted in a multiple layer display. Such context images may represent map images or outlines, track symbology, or other textual or graphical matter. Further, for example, such context images may have various dimensions (including height, width and color or bit depth).

For example, such a rendering process 84 may be initialized by creating and initializing an accumulated radar history image frame (e.g., a defined two dimensional array object sized as a function of the display and representative of a plurality of prior display images), creating and initializing a new radar image (e.g., a defined two dimensional array object for use in updating), and creating and initializing one or more context images (e.g., a two dimensional array object that receives image data from context image source 88). Further, at least one or more decay parameters are set upon initialization, as well as one or more compositing parameters used, for example, to perform blending or merging of images.

The rendering process 84 is then repeatedly called from the control program 46 executing on the CPU 40 in an update loop to generate the sequential display image frames (e.g., at a rate that matches the display update frame rate). The update loop may include at least polling for new radar image data to be used for updating the accumulated radar history image frame and polling for radar control information to obtain any update to the one or more decay parameters. Further, the loop also includes polling for any updates to the context images. With such data recognized, the GPU 42 applies a decaying function to the accumulated radar history image frame, adds the new radar image data to the decayed accumulated radar history image frame, saves the new accumulated radar history image frame for use in the next iteration, and combines any context images therewith and outputs the resulting frame.

The rendering process 84, as executed by the programmable GPU 42 under control of the CPU 40, provides an updated and decayed accumulated radar history image frame for use in generating a plurality of sequential display image frames 66 in the same manner as described with reference to FIG. 3. However, the rendering process 84 shown in FIG. 4 further provides for combining one or more context images 88 with the updated and decayed accumulated radar history image frame.

As shown in FIG. 4, the context images 88 include an overlay image 90 and an underlay image 92. Such context images 88 are provided by the application server 10 such that they are accessible by the GPU 42. For example, a user may call up context images 88 to be viewed with the radar image on the display 27 (e.g., using control program 46 executable on the CPU 40).

The context images 88 may be combined with the updated and decayed accumulated radar history image frame using the GPU 42 in any suitable manner. For example, as shown in FIG. 4, the underlay image 92 is blended by the GPU 42 with the updated and decayed accumulated radar history image frame.

For example, the blending routine 94 of the rendering process 84 to blend the pixel image data representative of the underlay image 92 (e.g., a map image) with the updated and decayed accumulated radar history image frame to generate a composite image frame may be implemented by comparing the pixel image data representative of the underlay image 92 with the updated and decayed accumulated radar history image frame on a pixel by pixel basis. Upon comparison of corresponding pixels of the images, the pixel having maximum intensity (i.e., the highest intensity) is selected for display (or for use in a compositing process that adds one or more further context images).

Further, for example, in the alternative, the blending routine 94 of the rendering process 84 to blend the pixel image data representative of the underlay image 92 with the updated and decayed accumulated radar history image frame to generate a composite image frame may select for display pixels of the updated and decayed accumulated radar history image frame if characterized by having an intensity above a selectable threshold (e.g., a non-zero value or any other threshold value). Otherwise, the blending routine 94 selects pixels of the pixel image data representative of the underlay image 92 for display. One will recognize that any blending process that preserves the visibility of the radar image above the underlay image 92 may be used.

Yet further, for example, as shown in FIG. 4, an overlay image 90 (e.g., track symbology) may be combined by the GPU with the updated and decayed accumulated radar history image frame, alone or in a composite image with the underlay image 92. For example, a chroma key routine 96 of the rendering process 84 may be used to provide for the combining of the images. In other words, for example, at least in one embodiment, removal of one or more colors from overlay image 90 to reveal the remainder of the radar image, or a composite of the radar image and an underlay image 92, may be used to combine the overlay image 90 with the other images. However, one will recognize that other methods of combining the overlay image 90 with the other images which allow the layer of the display below the overlay image 90 to be visible may be implemented by the GPU 42.

One will recognize from the description herein that the overlay image 90 and the underlay image 92 may each be combined with the updated and decayed accumulated radar history image frame alone and displayed therewith as a composite image. However, as described above, such an overlay image 90 and an underlay image 92 may both be combined with the updated and decayed accumulated radar history image frame for display. Yet further, additional context images may be composited with the updated and decayed accumulated radar history image frame using underlay and overlay blending techniques as described above, or other image layering and blending techniques to generate a single composite image. Further still, each of the original context images may have different dimensions (including height, width and color or bit depth), and may be scaled, cropped or otherwise transformed prior to being composited into the final image or any sub-region thereof.

Further, for example, at least in one embodiment, the image data frames (e.g., radar image frame and frames of one or more context images) may take the form of "textures" (e.g., texture pixels). As such, the generation of the sequential image display frames may be implemented using texture mapping performed by the GPU 42.

One exemplary embodiment of the algorithms for generating a composite image for display is provided below. The following Radar Display Software Algorithm (e.g., part of the control program 46 executable on the CPU 40) provides for the initialization and repeated execution of the Radar Compositer GPU Algorithm (e.g., the rendering function program 44 that runs on the GPU 40 when called by the CPU 40).

| Radar Display Software Algorithm |
| --- |
| 1. RadarDisplay(width, height) |
| 2. { |
| 3.    history[x,y] = initializeRadarHistory(width, height); |
| 4.    radar[x,y] = initializeRadarImage(width, height); |
| 5.    underlay[x,y] = initializeUnderlayImage(width, height); |
| 6.    overlay[x,y] = initializeOverlayImage(width, height); |
| 7.    decay = defaultDecay; |
| 8.    chromakey = transparent; |
| 9. |
| 10.   while (true) { |
| 11.     processUserInterfaceEvents( ); |
| 12.     clear(radar); |
| 13.     while (pollRadarData( )) |
| 14.      radar[x,y] = updateRadar(radar); |
| 15.     if (pollRadarControl( )) |
| 16.      decay = updateDecay( ); |
| 17.     if (pollUnderlay( )) |
| 18.      underlay[x,y] = updateUnderlay( ); |
| 19.     if (pollOverlay( )) |
| 20.      overlay[x,y] = updateOverlay( ); |
| 21.     RadarCompositer(history[x,y], radar[x,y], underlay[x,y], overlay[x,y], decay, chromakey); |
| 22.   } |
| 23. } |

Comments on Radar Display Software Algorithm:
1. Begin the declaration of the main algorithm function named RadarDisplay, with integer parameters defining the width and height dimensions of the screen display area.
2. Begin the body of function RadarDisplay.
3. Create and initialize the radar history image as a two dimensional array object, sized to the screen width and height dimensions, which may be passed to the GPU.
4. Create and initialize the new radar image as a two dimensional array object, sized to the screen width and height dimensions, which may be passed to the GPU.
5. Create and initialize the underlay context image as a two dimensional array object, sized to the screen width and height dimensions, which receives image data from a graphical application screen source and which may be passed to the GPU for further processing.
6. Create and initialize the overlay context image as a two dimensional array object, sized to the screen width and height dimensions, which receives image data from a graphical application screen source and which may be passed to the GPU for further processing.
7. Initialize the decay parameter to its default value.
8. Initialize the chromakey parameter to a value which will be interpreted as a transparent overlay pixel value by the GPU when generating the final composite display image.
9. Blank line separator.
10. Start of the main processing loop, which is executed repeatedly at a rate which matches the display update frame rate.
11. Process any user interface events, such as keyboard and mouse events, forwarding them to the applications displaying into the overlay context image screen.
12. Clear the new radar image buffer.
13. Poll for new radar data until all radar data queued since the previous loop iteration has been handled.
14. Draw each new radar data pulse into the new radar data image buffer, converting the received polar coordinate radar data samples to a rectangular coordinate radar image in accordance with U.S. Pat. No. 6,140,955.
15. Poll for radar control messages, and if received perform the following statement.
16. Update the decay rate parameter according to the received radar control message.
17. Poll for updates to the underlay context image source, and if received perform the following statement.
18. Update the underlay context image from the graphical application screen source data.
19. Poll for updates to the overlay context image source, and if received perform the following statement.
20. Update the overlay context image from the graphical application screen source data.
21. Call the RadarCompositer( ) function, performed by the GPU, to combine the new radar data image with the radar history image, generating and saving a new history image, then further compositing a final display image from the radar, underlay and overlay images. This function delays as required to synchronize display updates with the display frame rate.
22. End of while( ) statement for main processing loop.
23. Close the body of function RadarDisplay.

The following exemplary Radar Compositer GPU Algorithm (e.g., the rendering function program 44 that runs on the GPU 42 when called by the CPU 40) is the compositing algorithm performed during each iteration to generate the composite image from the image data accessible by the GPU.

| Radar Compositer GPU Algorithm |
| --- |
| 1. RadarCompositer(history[x,y], radar[x,y], underlay[x,y], overlay[x,y], decay, chromakey) |
| 2. { |
| 3.   history[ ] = history[ ] − decay; |
| 4.   history[ ] = max(history[ ], radar[ ]); |
| 5.   save(history); // Save for next iteration |
| 6.   blend[ ] = max(underlay[ ], history[ ]); |
| 7.   if (overlay[ ] = chromakey) { |
| 8.     result[ ] = blend[ ]; |
| 9.   } else { |
| 10.     result[ ] = overlay[ ]; |
| 11.   } |
| 12.   output(result);   // Synchronized with Frame Rate |
| 13. } |

Comments on Radar Compositer GPU Algorithm:
1. Begin the declaration of the Graphics Processing Unit (GPU) program named RadarCompositer with parameters history[x,y], radar[x,y], underlay[x,y], overlay[x,y], decay and chromakey, where parameter history[x,y] is a two dimensional image data array containing the accumulated radar history, radar[x,y] is a two dimensional image data array containing new radar data accumulated and drawn since the previous iteration, underlay[x,y] and overlay[x,y] are two dimensional image data arrays containing context image data, decay is a scalar proportional to the desired radar image decay rate and chromakey is a pixel data value which specifies the overlay transparency value.
2. Begin the body of function RadarCompositer. The algorithm defined by this function is executed by the GPU as a programmable pixel shader, and as such operates once per call iteration on every pixel on the display, potentially processing multiple pixels concurrently as enabled by the parallelism of the particular GPU.
3. Subtract the decay value from each element of the accumulated radar history image.

4. Merge the new radar data image with the accumulated radar history image by selecting the maximum of the two images at each image coordinate location.
5. Preserve the resulting radar history image for use in the next processing iteration.
6. Blend the new radar history image with the underlay context image by selecting the maximum of the two images at each image coordinate location.
7. For each image coordinate location, if the overlay context image matches the chromakey value, perform the following statement, otherwise perform the statement specified in the else clause.
8. Assign the result value to be the blend of the underlay and radar history images generated above.
9. Else clause, performed when the prior 'if' statement is false.
10. Assign the result value to be the overlay context image.
11. Terminate the if-else statement.
12. Output result containing the final value of the pixel in RGB format to the GPU output frame buffer.
13. Close the body of function RadarCompositer.

Figure 5:
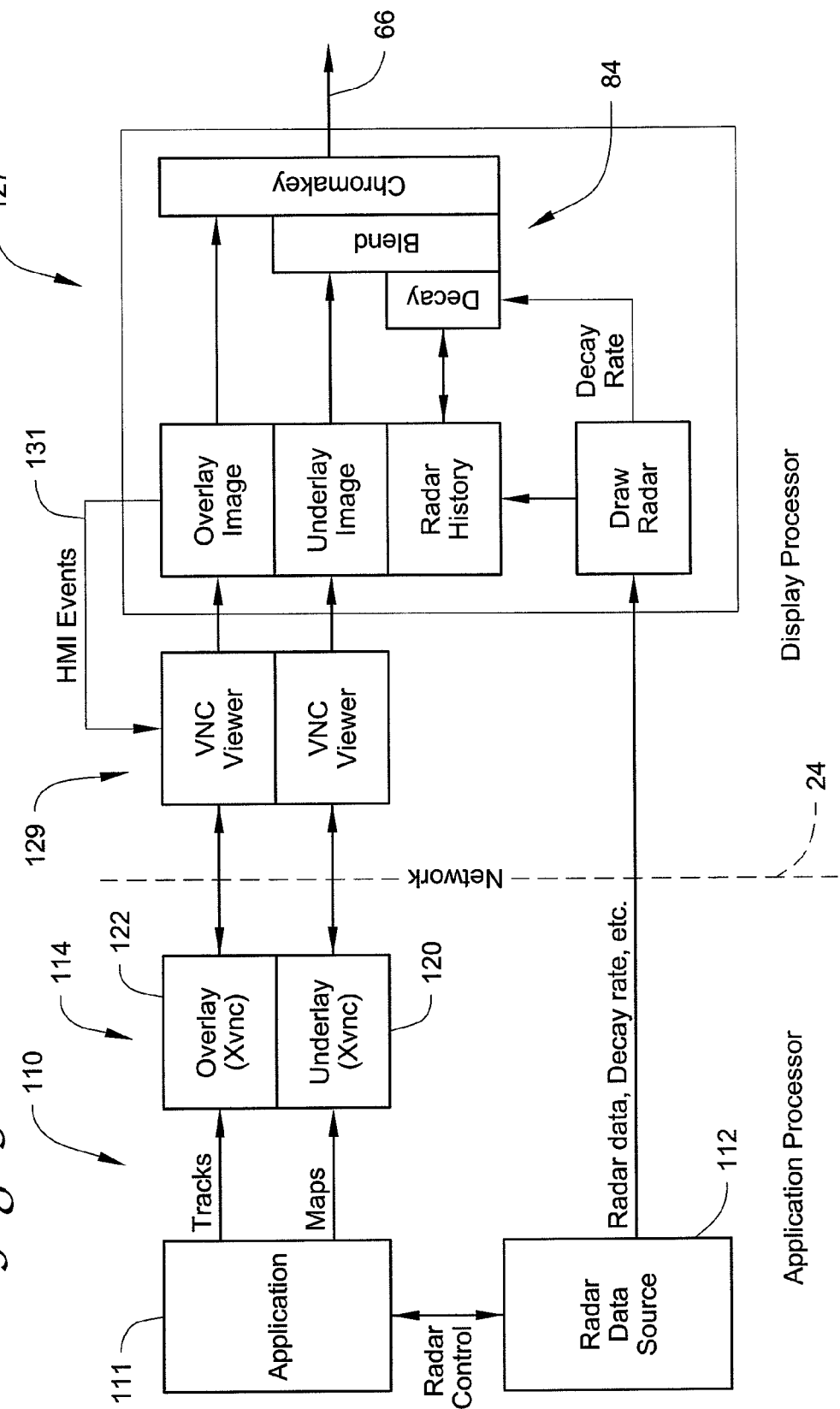
FIG. 5 is a block diagram of a more detailed embodiment of a single thin display client implementation, such as that summarized in the block diagram of FIG. 2, which may be used in a display system architecture as shown in FIG. 1.

FIG. 5 is a block diagram of a more detailed embodiment of a single thin client implementation, such as that summarized in the block diagram of FIG. 2, which may be used in a display system architecture as shown in FIG. 1. FIG. 5 shows a thin client architecture with an application server 110 and one or more thin display clients 127 (represented by a single display client for simplicity). This illustrative embodiment utilizes the X Windowing system and the corresponding thin client Virtual Network Computing (VNC) software Xvnc including VNC servers 114 serving context images, including an overlay image 122 and an underlay image 120, to VNC viewers 129. In one embodiment, the architecture transports the overlay and underlay images 120, 122 from the application 111 to a memory mapped virtual frame buffer, X Virtual Frame Buffer (Xvfb) for use by the GPU 42 in combining such images with the radar data.

The user of each display client 127 may control the application 111 operating on the application server 110 (e.g., as shown by the HMI events 131). For example, such HMI events 131 may be forwarded from the overlay VNC viewer 129 to the overlay VNC server 122 and back to the originating application 111 to interact with the application Graphical User Interface (GUI).

The application 111 may serve to provide any type of functionality and the present invention is not limited to that described herein. In one embodiment, the application 111 may be used to control various display parameters, such as the decay rate of the radar, the radar source, the range scale, the window size, the radar offset, radar threshold or other video filtering functions, range, bearing and/or sweep indications, etc. Further, the application 111 may control the type of information to be displayed with the radar (e.g., underlay and/or overlay images).

The application server 110 operates on data such as that received over a network as shown in FIG. 1 and provides, at least in one embodiment, track symbology as part of the overlay image 122 and a map image as the underlay image 120. The radar data source 112 may provide digital radar data from one or more radar processors over a network as described with reference to FIG. 1, or may include local real time radar data or even pre-recorded radar data. As described herein, the application 111 controls the radar data to be provided to the thin display client so as to generate and update the radar image.

The data communicated between the application server 110 and the thin display client 127 across network 24 may be communicated using any suitable network protocol such as TCP/IP. Such communication of information is synchronized as suitably controlled by the application 111 (e.g., synching radar image frames with context image frames). The rendering process 84 shown in FIG. 5 carried out by the GPU was previously described with reference to FIG. 4, and therefore, for simplicity will not be described further with reference to FIG. 5. One will recognize that the equivalent thin display client embodiment may be implemented with other thin client programs.

Figure 6:
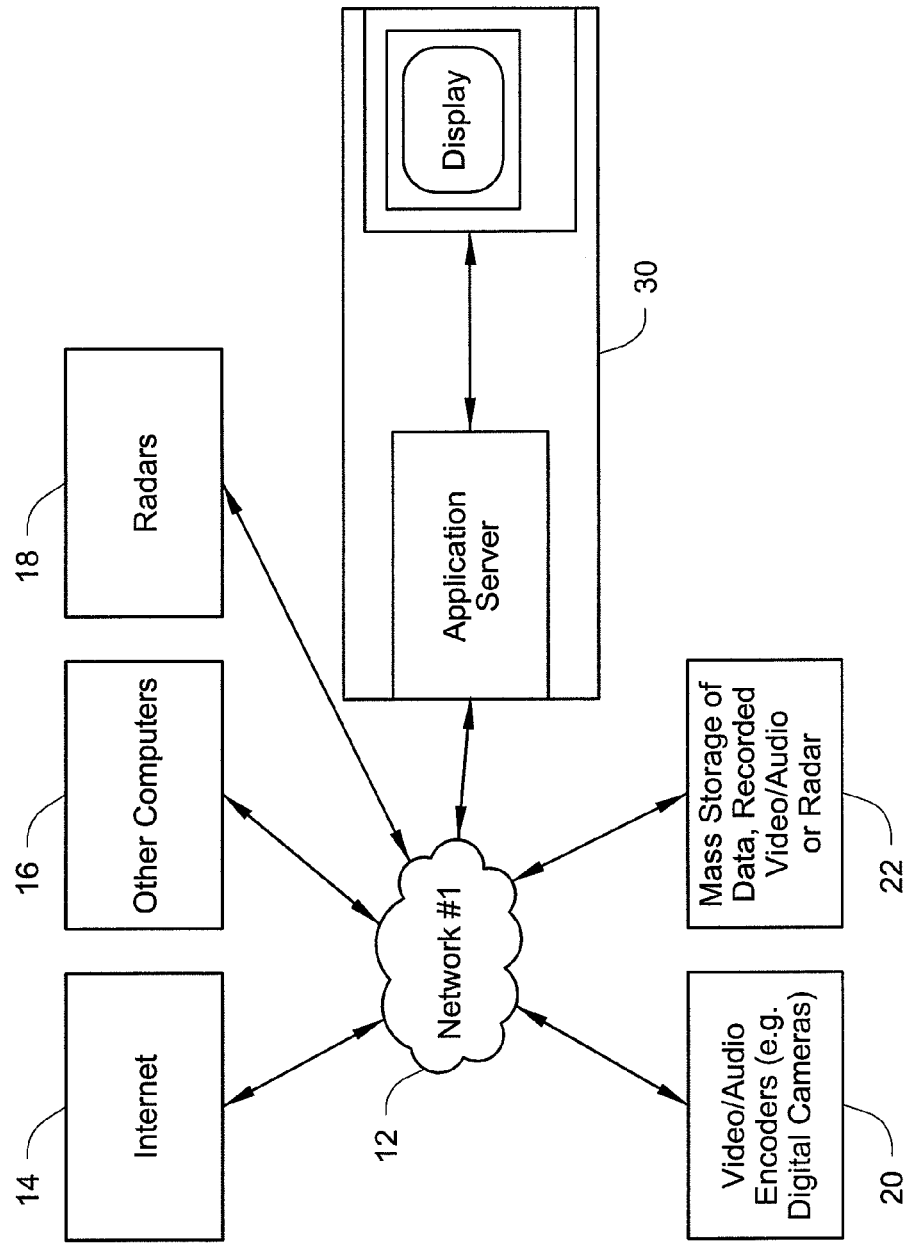
FIG. 6 is a block diagram of another embodiment of a radar display system architecture according to the present invention showing a thick display client implementation coupled to various data sources by way of a network.

FIG. 6 is a block diagram of another embodiment of a radar display system architecture according to the present invention showing a thick client 30 coupled to various data sources 14, 16, 18, 20, and way of a network 12. In the thick client embodiment, the processing performed at the application server 10 and thin client 26 as described with reference to FIG. 1 is partially or completely performed at the thick client 30. Further, the application server 10 and thin client 26 are co-located and may be partially or completely comprised of common hardware elements.

Yet further, a display client 26 for generating a plurality of sequential display image frames for use in displaying at least a radar image on the display or for use in displaying one or more of the context images with the radar image on a display may be implemented using a composite manager, such as compiz (Linux), Quartz Extreme (Apple OS X) or Aero (Microsoft Windows Vista).

For example, in such a manner, windows (e.g., radar images, context images, other graphics or windows) may be rendered to off-screen "texture" memory (rather than directly to a final screen buffer associated with the GPU). Then the windows (e.g., radar images, context images, other graphics or windows) are composited into the final screen display by a "composite manager" or "compositing window manager." This type of implementation has the advantage that application windows (e.g., including radar and context windows) may be rendered by the GPU, for example, taking advantage of the GPU's hardware accelerated rendering capabilities.

For example, in implementing the rendering function program using a composite manager, the rendering function program may be implemented as part of a "plugin" to the composite manager, including a set of CPU subroutines called by the composite manager to initialize and control the operation of the rendering function program and programmable shader subroutines implementing the rendering function program to be compiled into the graphics processing unit and executed under control of the composite manager potentially along with shader algorithms implemented by the composite manager itself and/or other plugins.

For example, the composite manager, potentially in conjunction with native windowing environment software such as, for example, the X windowing system in a Linux environment may perform functions similar to some of the those performed by the control program 46 as shown generally in FIG. 2. The composite manager may initialize the display client 26 and thereafter control generation of a plurality of sequential display image frames for use in displaying at least a radar image on a display or for use in displaying one of the context images with the radar image on a display.

In one embodiment, for example, the composite manager may call a rendering function program executable by the programmable graphics processing unit to render updated and decayed accumulated radar history image frames to memory and/or call one or more other context display image rendering algorithms executable by the programmable graphics processing unit to render to memory one or more context image frames from the pixel image data representative of the one or more context images provided by the application processing apparatus. The composite manager may also call one or more compositing algorithms (e.g., blending, merging, chroma keying, or other compositing algorithms) executable by the programmable graphics processing unit to generate a composite image as a function of the rendered frames or windows (e.g., rendered radar images, context images, graphical user interface windows, etc.).

The complete disclosure of the patents, patent documents, and publications cited in the Background, the Summary, the Detailed Description of Exemplary Embodiments, and elsewhere herein are incorporated by reference in their entirety as if each were individually incorporated. Exemplary embodiments of the present invention are described above. Those skilled in the art will recognize that many embodiments are possible within the scope of the invention. Other variations, modifications, and combinations of the various components and methods described herein can certainly be made and still fall within the scope of the invention. Thus, the invention is limited only by the following claims and equivalents thereto.

What is claimed is:

1. A radar display system comprising:
one or more displays;
one or more radar data sources providing digital polar coordinate radar data;
application processing apparatus to receive the digital polar coordinate radar data and provide one or more rectangular coordinate display parameters, wherein the one or more rectangular coordinate display parameters comprise at least polar to rectangular coordinate conversion information for use in converting the digital polar coordinate radar data to rectangular coordinate pixel radar image data and one or more decay rate parameters; and
display processing apparatus comprising a central processing unit and a programmable graphics processing unit, wherein a rendering function program executable by the programmable graphics processing unit under control of the central processing unit generates a plurality of sequential display image frames for use in displaying at least a radar image on a display, and further wherein the rendering function program, to generate each of the plurality of the sequential display image frames, comprises executable code to:
apply a decaying function to an accumulated radar history image frame based on the one or more decay rate parameters; and
update the accumulated radar history image frame using rectangular coordinate pixel radar image data converted from digital polar coordinate radar data received from the application processing apparatus using at least the polar to rectangular coordinate conversion information, wherein applying the decaying function and updating the accumulated radar history image frame results in an updated and decayed accumulated radar history image frame for use in displaying at least a radar image on the display, and further wherein the updated and decayed accumulated radar history image frame used in displaying at least a radar image on the display is stored as an accumulated radar history image frame for use in generating a subsequent display image frame.

2. The radar display system of claim 1, wherein, to update the accumulated radar history image frame using rectangular coordinate pixel radar image data converted from digital polar coordinate radar data, the rendering function program comprises executable code to:

access an update frame of rectangular coordinate pixel radar image data converted from a frame of digital polar coordinate radar data received from the application processing apparatus using at least the polar to rectangular coordinate conversion information; and
merge the update frame with the accumulated radar history image frame by comparing the update frame and the accumulated radar history image frame on a pixel by pixel basis and selecting for display the pixel having maximum intensity.

3. The radar display system of claim 1, wherein the system further comprises one or more other image data sources to provide digital image data representative of one or more context images, and wherein the application processing apparatus provides pixel image data representative of the one or more context images to be displayed with the at least one radar image on the display, and further wherein the rendering function program comprises executable code to combine the pixel image data representative of the one or more context images with the updated and decayed accumulated radar history image frame to generate a composite image frame for use in presenting the one or more context images with the radar image on the display.

4. The radar display system of claim 3, wherein the system further comprises an interconnection network coupled between the application processing apparatus and the display processing apparatus, and further wherein a control program executable by the central processing unit of the display processing apparatus controls the communication of the digital image data representative of one or more context images between the application processing apparatus and the display processing apparatus.

5. The radar display system of claim 3, wherein the one or more context images comprises at least one of an underlay image and an overlay image to be displayed with the radar image on the display, and further wherein the rendering function program comprises executable code to combine the pixel image data representative of the at least one of the underlay image and the overlay image with the updated and decayed accumulated radar history image frame to generate a composite image frame for use in presenting the one or more context images with the radar image on the display.

6. The radar display system of claim 5, wherein the one or more context images comprises an underlay image to be displayed with the radar image on the display, and further wherein the rendering function program comprises executable code to blend the pixel image data representative of the underlay image with the updated and decayed accumulated radar history image frame to generate a composite image frame for use in presenting the one or more context images with the radar image on the display.

7. The radar display system of claim 6, wherein, to blend the pixel image data representative of the underlay image with the updated and decayed accumulated radar history image frame to generate a composite image frame, the rendering function program comprises executable code to compare the pixel image data representative of the underlay image with the updated and decayed accumulated radar history image frame on a pixel by pixel basis and selecting for display the pixel having maximum intensity.

8. The radar display system of claim 6, wherein, to blend the pixel image data representative of the underlay image with the updated and decayed accumulated radar history image frame to generate a composite image frame, the rendering function program comprises executable code to select for display pixels of the updated and decayed accumulated radar history image frame if characterized by having an intensity above a selectable threshold, otherwise selecting for display pixels of the pixel image data representative of the underlay image.

9. The radar display system of claim 6, wherein the one or more context images comprise an overlay image to be displayed with the radar image and the underlay image on the display, and further wherein the rendering function program comprises executable code to combine, using chroma keying, the pixel image data representative of the overlay image with the updated and decayed accumulated radar history image frame previously blended with the pixel image data representative of the underlay image to generate a composite image frame for use in presenting the one or more context images with the radar image on the display.

10. The radar display system of claim 5, wherein the one or more context images comprise an overlay image to be displayed with the at least one radar image on the display, and further wherein the rendering function program comprises executable code to combine the pixel image data representative of the overlay image with the updated and decayed accumulated radar history image frame by chroma keying to generate a composite image frame for use in presenting the one or more context images with the radar image on the display.

11. The radar display system of claim 1, wherein the system further comprises an interconnection network coupled between the application processing apparatus and the display processing apparatus.

12. The radar display system of claim 1, wherein the system further comprises an interconnection network coupled between the one or more radar data sources and the application processing apparatus.

13. The radar display system of claim 1, wherein the system further comprises one or more other image data sources to provide image data representative of one or more context images, wherein the application processing apparatus provides pixel image data representative of the one or more context images to be displayed with the at least one radar image on the display, wherein the display processing apparatus comprises a composite manager to:
call the rendering function program executable by the programmable graphics processing unit to render updated and decayed accumulated radar history image frames;
call one or more other context display image rendering algorithms executable by the programmable graphics processing unit to render one or more context image frames from the pixel image data representative of the one or more context images provided by the application processing apparatus; and
call one or more compositing algorithms executable by the programmable graphics processing unit for use in combining the one or more context image frames with the updated and decayed accumulated radar history image frame into a final display image frame.

14. A radar display method comprising:
providing one or more displays;
providing an application processing apparatus to receive digital polar coordinate radar data and provide one or more rectangular coordinate display parameters based thereon, wherein the one or more rectangular coordinate display parameters comprise at least polar to rectangular coordinate conversion information for use in converting the digital polar coordinate radar data to rectangular coordinate pixel radar image data and one or more decay rate parameters; and
receiving, at a display processing apparatus from the application processing apparatus, the digital polar coordinate radar data and the one or more rectangular coordinate display parameters, wherein the display processing apparatus comprises a central processing unit and a programmable graphics processing unit;
generating a plurality of sequential display image frames by the programmable graphics processing unit under control of the central processing unit for use in displaying at least a radar image on a display, wherein generating each of the plurality of the sequential display image frames comprises:
applying a decaying function to an accumulated radar history image frame based on the one or more decay rate parameters;
updating the accumulated radar history image frame using rectangular coordinate pixel radar image data converted from digital polar coordinate radar data received from the application processing apparatus using at least the polar to rectangular coordinate conversion information, wherein applying the decaying function and updating the accumulated radar history image frame by the graphics processing unit results in an updated and decayed accumulated radar history image frame for use in displaying at least a radar image on the display; and
storing the updated and decayed accumulated radar history image frame used in displaying at least a radar image on the display for use in generating a subsequent display image frame.

15. The radar display method of claim 14, wherein updating the accumulated radar history image frame comprises:
accessing an update frame of rectangular coordinate pixel radar image data converted from a frame of digital polar coordinate radar data received from the application processing apparatus using the polar to rectangular coordinate conversion information; and
merging the update frame with the accumulated radar history image frame by comparing the update frame and the accumulated radar history image frame on a pixel by pixel basis and selecting for display the pixel having maximum intensity.

16. The radar display method of claim 14, wherein the method further comprises providing digital image data representative of one or more context images, wherein the application processing apparatus receives the digital image data representative of the one or more context images to generate pixel image data representative of the one or more context images to be displayed with the at least one radar image on the display, and wherein generating each of the plurality of the sequential display image frames by the programmable graphics processing unit further comprises combining the pixel image data representative of the one or more context images with the updated and decayed accumulated radar history image frame to generate a composite image frame for use in presenting the one or more context images with the radar image on the display.

17. The radar display method of claim 16, wherein the method further comprises receiving, at a display processing apparatus from the application processing apparatus, the digital image data representative of one or more context images from an interconnection network coupled between display processing apparatus and the application processing apparatus.

18. The radar display method of claim 16, wherein the one or more context images comprises at least one of an underlay image and an overlay image to be displayed with the radar image on the display, and further wherein generating each of the plurality of the sequential display image frames by the programmable graphics processing unit further comprises combining the pixel image data representative of the at least one of the underlay image and the overlay image with the updated and decayed accumulated radar history image frame to generate a composite image frame for use in presenting the one or more context images with the radar image on the display.

19. The radar display method of claim 18, wherein the one or more context images comprises an underlay image to be displayed with the radar image on the display, and further wherein generating each of the plurality of the sequential display image frames by the programmable graphics processing unit further comprises blending the pixel image data representative of the underlay image with the updated and decayed accumulated radar history image frame to generate a composite image frame for use in presenting the one or more context images with the radar image on the display.

20. The radar display method of claim 19, wherein blending the pixel image data representative of the underlay image with the updated and decayed accumulated radar history image frame to generate a composite image frame comprises comparing the pixel image data representative of the underlay image with the updated and decayed accumulated radar history image frame on a pixel by pixel basis and selecting for display the pixel having maximum intensity.

21. The radar display method of claim 19, wherein blending the pixel image data representative of the underlay image with the updated and decayed accumulated radar history image frame to generate a composite image frame comprises selecting for display pixels of the updated and decayed accumulated radar history image frame if characterized by having an intensity above a selectable threshold, otherwise selecting for display pixels of the pixel image data representative of the underlay image.

22. The radar display method of claim 19, wherein the one or more context images comprises an overlay image to be displayed with the radar image and the underlay image on the display, and further wherein generating each of the plurality of the sequential display image frames by the programmable graphics processing unit further comprises combining, with the use of chroma keying, the pixel image data representative of the overlay image with the updated and decayed accumulated radar history image frame previously blended with the pixel image data representative of the underlay image to generate a composite image frame for use in presenting the one or more context images with the radar image on the display.

23. The radar display method of claim 18, wherein the one or more context images comprises an overlay image to be displayed with the at least one radar image on the display, and further wherein generating each of the plurality of the sequential display image frames by the programmable graphics processing unit further comprises combining the pixel image data representative of the overlay image with the updated and decayed accumulated radar history image frame by chroma keying to generate a composite image frame for use in presenting the one or more context images with the radar image on the display.

24. The radar display method of claim 14, wherein receiving, at a display processing apparatus from the application processing apparatus, the digital polar coordinate radar data and the one or more rectangular coordinate display parameters comprises receiving the digital polar coordinate radar data and the one or more rectangular coordinate display parameters via an interconnection network coupling the display processing apparatus and the application processing apparatus.

25. The radar display method of claim 14, wherein the method further comprises receiving the digital polar coordinate radar data from an interconnection network coupled between one or more radar data sources and the application processing apparatus.

26. The radar display method of claim 14, wherein the method further comprises:
   providing pixel image data representative of one or more context images to be displayed with the at least one radar image on the display;
   using a composite manager to call the rendering function program executable by the programmable graphics processing unit to render updated and decayed accumulated radar history image frames;
   using the composite manager to call one or more other context display image rendering algorithms executable by the programmable graphics processing unit to render one or more context image frames from the pixel image data representative of the one or more context images provided by the application processing apparatus; and
   using a composite manager to call one or more compositing algorithms executable by the programmable graphics processing unit for use in combining the one or more context image frames with the updated and decayed accumulated radar history image frame into a final display image frame.

* * * * *